United States Patent Office 2,897,878
Patented Aug. 4, 1959

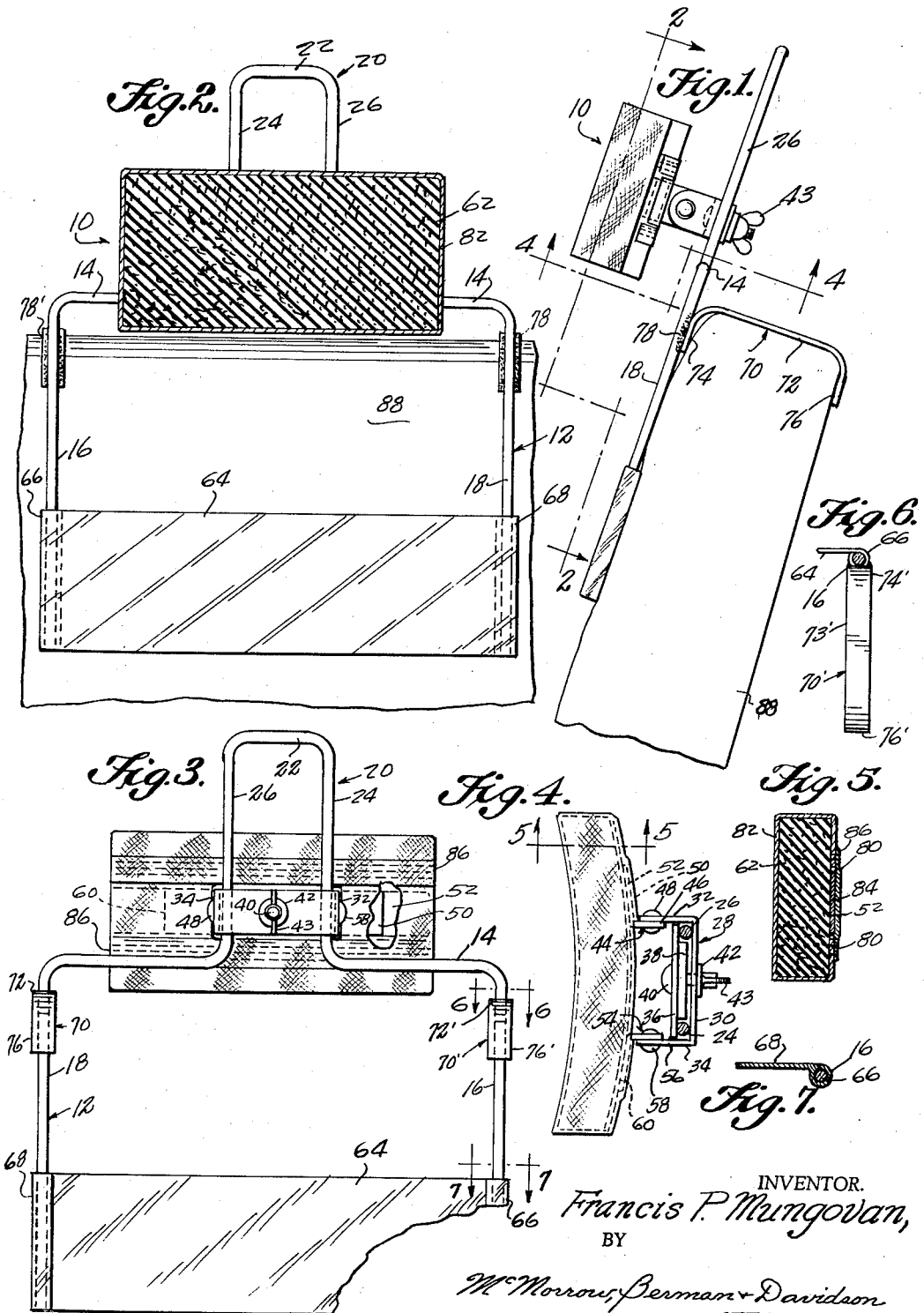

2,897,878
REMOVABLE HEAD REST FOR VEHICLES
Francis P. Mungovan, Buffalo, N.Y.
Application September 20, 1957, Serial No. 685,193
1 Claim. (Cl. 155—174)

This invention relates to anatomical supports and more specifically, the invention pertains to head rests adapted for removable attachment to the back of an automobile seat.

It is well known in this art that head rests have been devised, but for the most part none of the prior art devices have won acclaim from the manufactures nor acceptance by the public at large. This is due to many factors among which, and of primary importance, is the fact that most of the devices of a related nature are bulky and unsightly in appearance, impractical in usage and, generally speaking, restricted to use in connection with a particular automobile of a given year and make.

Consequently, one of the primary objects of this invention is to provide a vehicle head rest for attachment to the backs of either the front or rear seats of a vehicle of any year or make, the head rest being specifically designed to obviate the above referred to unfavorable factors ond wherein the head rest may be removably installed in any given vehicle without the use of special tools.

Another object of this invention is to provide a head rest for attachment to the back of an automotive vehicle seat which may be vertically and angularly adjusted to accommodate the physical characteristics and requirements of the user.

A further object of this invention is to provide a head rest of the type generally described supra which may be installed without the use of tools.

Still another object of this invention is to provide a head support which may be readily incorporated with the back of a seat or other article of furniture serving as an occupant support, and more particularly, the present invention is addressed to a head support for persons who are subjected to constant variable stresses and strains as a consequence of varied movement of a vehicle.

A still further object of this invention is to provide a head rest of the type generally referred to above, which will substantially eliminate and reduce to a minimum stresses and strains attendant upon vehicle movement with a resulting reduction of fatigue.

It is still another object of this invention to provide a head rest for installation in a moving vehicle, the head rest having shock absorbing means thereon.

This invention contemplates, as a still further object thereof, the provision of a head rest for attachment to the back of a vehicle seat, the head rest being non-complex in construction and assembly, inexpensive to manufacture, and durable in use.

Other and further objects and advantages of the instant invention will become more evident from a consideration of the following specification when read in conjunction with the annexed drawing, in which:

Figure 1 is a side elevational view, partly in section, of a head rest constructed in accordance with the teachings of the present invention;

Figure 2 is a front elevational view, partly in cross-section, of the head rest illustrated in Figure 1, Figure 2 being taken substantially on the line 2—2 of Figure 1, looking in the direction of the arrows;

Figure 3 is a rear elevational view of the head rest illustrated in Figure 1;

Figure 4 is an enlarged detail fragmentary cross-sectional view taken substantially on the line 4—4 of Figure 1, looking in the direction of the arrows;

Figure 5 is a detail cross-sectional view taken substantially on the horizontal plane of line 5—5 of Figure 1;

Figure 6 is a detail cross-sectional view taken substantially on the horizontal plane of line 6—6 of Figure 3, looking in the direction of the arrows; and Figure 7 is a detail cross-sectional view taken substantially on the horizontal plane of line 7—7 of Figure 3, looking in the direction of the arrows.

Referring now more specifically to the drawing, reference numeral 10 designates, in general, a head rest for a vehicle, the head rest being constructed in accordance with this invention. The head rest 10 is seen to comprise a main frame 12 formed of a single length of a steel rod having an inverted substantially U-shaped configuration. The main frame 12 is seen to include a bight portion 14 from the opposed ends of which depend a pair of laterally spaced, elongated, parallel and confronting arms 16, 18. As is seen in Figures 2 and 3, the bight portion 14 is interrupted intermediate its ends to form an upright, inverted, substantially U-shaped bracket 20 having a bight portion 22 from the ends of which depend a pair of laterally spaced, elongated, parallel and confronting arms 24, 26, the lower ends of the latter being integrally connected with the bight 14.

Reference numeral 28 connotes one of a pair of clamping jaws. Utilizing Figure 4 of the drawing as a point of reference, the jaw 28 is seen to have a reversed C-shaped configuration including a centrally apertured bight 30 from the ends of which project a pair of spaced, parallel and confronting arms 32, 34 adapted to tangentially engage around the remotely disposed sides of the bracket arms 24, 26, respectively.

The other clamping jaw comprises a substantially rectangular centrally apertured plate 36 disposed between the arms 32, 34 and to which is secured a centrally apertured spacer plate 38 located between the arms 24, 26 of the bracket 20.

A carriage bolt 40 extends through the apertures formed in the bight 30, plate 36 and spacer plate 38, the bolt 40 having a lock washer 42 and a wing nut 43 threaded thereon. By tightening the nut 44 the clamping jaws 28 and 36 may be held in selected adjusted positions on the arms 24, 26.

Reference numeral 44 designates an L-shaped hanger arm having a foot portion 46 pivotally connected to the arm 32 at 48. The leg portion 50 of the hanger bar 44 projects laterally away from the arm 32 and is fixedly secured to one side of an elongated, normally horizontally extending arcuate metallic head rest backing member 52 adjacent one end thereof. Reference numeral 54 designates a second L-shaped hanger arm having a foot portion 56 pivotally connected at 58 to the arm 34. The other end or leg portion 60 projects laterally away from the arm 34 and is fixedly secured to the backing member 52 adjacent the other end thereof. An arcuately shaped head rest 62 formed of sponge rubber or of other similar materials is fixedly secured to the backing member 52 by any means conventional in the art.

From the foregoing portion of this specification it is now obvious that the head rest 62 may be vertically adjusted relative to the bracket 20 to any selected position, and that the head rest 62 is also provided with a vertical pivotal movement for adjustment to an angle of inclination suitable to the user.

Reference numeral 64 designates a sheet of flexible plastic material, the ends of which 66, 68 encase the lower ends of the arms 16, 18, respectively.

Reference numerals 70, 70' indicate a pair of identically constructed, inverted and substantially U-shaped hanger brackets, each of which is provided with a bight portion 72, 72. respectively. A pair of integrally connected, spaced and confronting arms 74, 76 depend from the bight portion 72, and a similar pair of integrally connected, spaced and confronting arms 74', 76' depend from the bight portion 72'. As is seen in the drawing, the arms 74, 74' are connected to the arms 18, 16, respectively, adjacent the upper ends thereof as by welding 78, 78', the hanger brackets 70, 70' projecting away therefrom at substantially right angles with respect to the plastic sheet 64.

The head rest 62 may be, if desired, inserted through an elongated substantially rectangular slot 80 formed in a substantially hollow rectangular fabric casing 82 after which a fabric cover member 84 may be placed over the slot 80 to cover the backing member 52 and the leg portions 50 and 60. Stitching 86 secures the fabric cover to the casing 82. Preferably the casing 82 is formed of terrycloth or of any other similar material.

To utilize the above described head rest, the hanger arms 70, 72 are placed over the upper end of the seat back 88 with the plastic sheet 64 extending across the forward side thereof. In this position the back of the user presses the plastic sheet 64 firmly against the forward face of the vehicle seat back 88 and thereby prevents the head rest 10 from shifting vertically or laterally. The head rest 62 is now moved vertically with respect to the bracket 20 to receive the user's head therein, and the angle of inclination thereof adjusted to insure the maximum of ease and comfort for the user.

Having described and illustrated one embodiment of this invention in detail, it will be understood that the same is offered merely by way of example, and that this invention is to be limited only by the scope of the appended claim.

What is claimed is:

A head support assembly for the occupant of a vehicle, said vehicle having a seat and a back therefor, said head support comprising a substantially open main frame having an inverted substantially U-shaped configuration including a bight portion from the end of which depends a pair of spaced confronting arms, a sheet of flexible material extending between and secured to the distal ends of said arms to prevent spreading of said arms and to protectively cover the portion of said seat back between said arms, said bight portion being interrupted intermediate its ends to form an integral inverted substantially U-shaped bracket projecting away from said bight, said inverted bracket including a bight portion from the ends of which extend a pair of spaced and confronting arms, a substantially C-shaped main clamping jaw having a bight portion from the ends of which extend a pair of arms, said clamping jaw bight and said arms engaging around the arms of said bracket, said bight of said C-shaped jaw having a substantially centrally disposed aperture formed therein, a clamping plate, said clamping plate engaging against those sides of said arms remotely disposed with respect to said last named bight, said clamping plate having a centrally disposed aperture formed therein in alignment with said aperture of said bight of said C-shaped jaw, means extending through said aperture in said bight and said clamping plate to rigidly secure said C-shaped clamping jaw on said arms of said brackets at any selected position thereon, a backing plate having a head rest pad secured thereto, and a pair of L-shaped hanger arms secured to the backing plate and having their respective foot portions projecting outwardly therefrom, said foot portions being pivotally connected to said arms of said C-shaped clamping jaw, and means projecting laterally from said main frame for extension across the top of said seat back to releasably support said assembly on said seat back.

References Cited in the file of this patent

UNITED STATES PATENTS

| | | |
|---|---|---|
| 2,613,731 | Roginski | Oct. 14, 1952 |
| 2,634,798 | Taylor | Apr. 14, 1953 |
| 2,661,050 | Felter | Dec. 1, 1953 |

FOREIGN PATENTS

| | | |
|---|---|---|
| 33,452 | France | May 6, 1928 |